Figure 3:
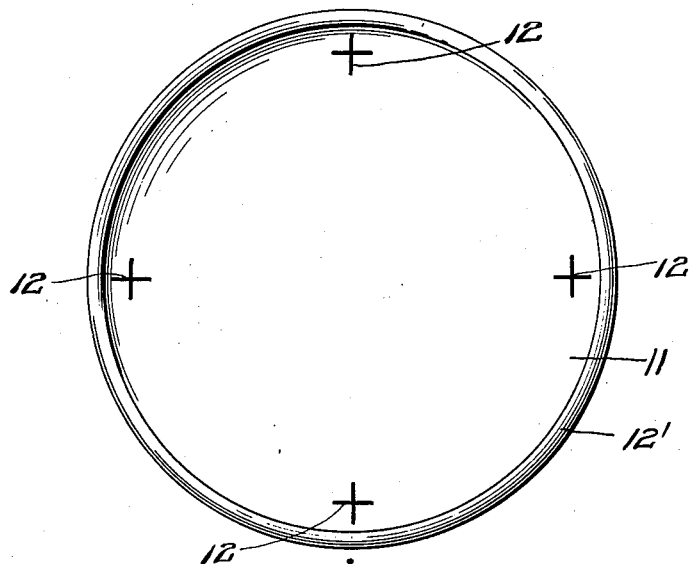

No. 862,151. PATENTED AUG. 6, 1907.
P. FRIEDMAN & A. H. CARLISLE.
HEATING CAN.
APPLICATION FILED NOV. 25, 1905.
3 SHEETS—SHEET 1.
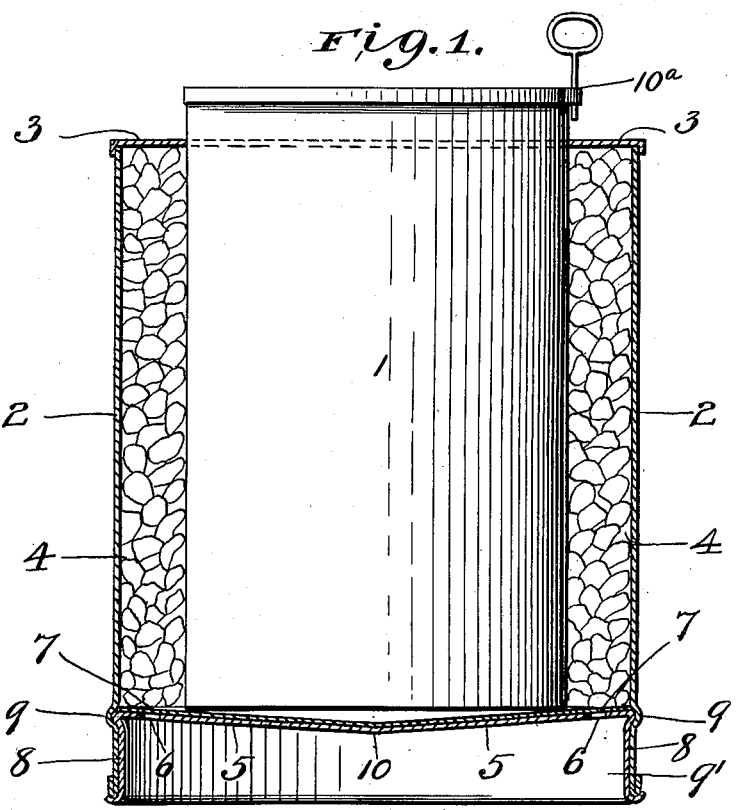
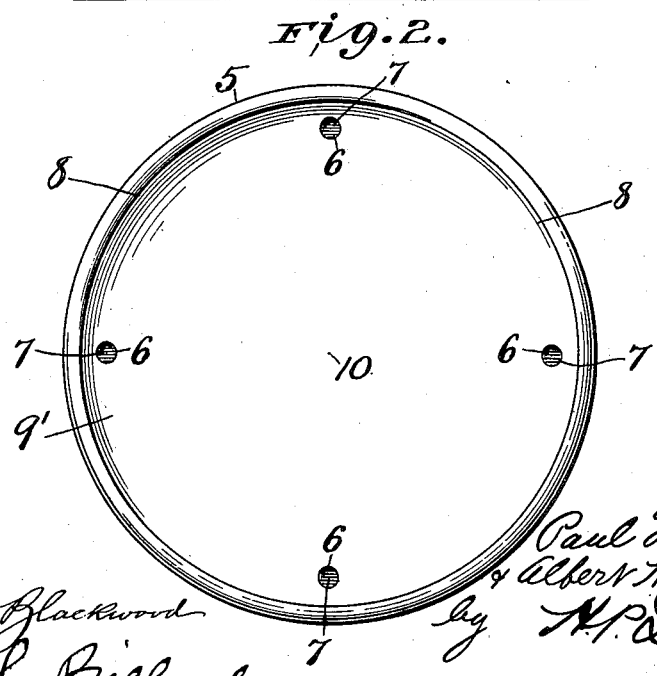
Witnesses
Jos. N. Blackwood
Geo. C. Billard
Inventors
Paul Friedman
& Albert H. Carlisle
by H. P. Doolittle
Attorney No. 862,151. PATENTED AUG. 6, 1907.
P. FRIEDMAN & A. H. CARLISLE.
HEATING CAN.
APPLICATION FILED NOV. 25, 1905.

3 SHEETS—SHEET 2.

No. 862,151. PATENTED AUG. 6, 1907.
P. FRIEDMAN & A. H. CARLISLE.
HEATING CAN.
APPLICATION FILED NOV. 25, 1905.

3 SHEETS—SHEET 3.

Witnesses
Jas. H. Blackwood
J. H. McCord

Inventors
Paul Friedman &
Albert H. Carlisle
By H. P. Doolittle
Attorney

UNITED STATES PATENT OFFICE.

PAUL FRIEDMAN AND ALBERT HARFORD CARLISLE, OF NEW YORK, N. Y., ASSIGNORS TO THE AETNA SELF HEATING FOOD COMPANY, OF JERSEY CITY, NEW JERSEY, A CORPORATION OF NEW JERSEY.

HEATING-CAN.

No. 862,151.  Specification of Letters Patent.  Patented Aug. 6, 1907.

Application filed November 25, 1905. Serial No. 289,058.

*To all whom it may concern:*

Be it known that we, PAUL FRIEDMAN, a subject of the Emperor of Germany, and ALBERT HARFORD CARLISLE, a citizen of the United States, both residing at New York, in the county of New York and State of New York, have invented new and useful Improvements in Heating-Cans, of which the following is a specification.

Our invention relates to self-heating cans for use in connection with canned foods and its object is to provide a can suitable for heating or cooking the food contained therein without the application of external heat, and of such construction that it may be easily and cheaply manufactured and may be readily disrupted to permit the mixture of the elements of the heating compound.

Our invention relates to the heating of the food in the can by means of the heating reaction due to the introduction of water into a suitable chemical placed in a chamber adjoining the food receptacle.

There have been various attempts to use for self-heating purposes, the heating properties of various chemicals, when brought in contact with water, but up to the present time, so far as we are aware, the only device adapted to carrying out this use has been that of a can or receptacle having a double bottom or separate chamber containing the water when the can is sold, and having a chemical containing chamber separated by the metal wall of the chambers from the water, which wall must be pierced or disrupted by a metal punch or similar device to establish communication between the chambers. The evident objections to such a construction are that unless the water chamber is absolutely water-tight the chemical action will be set up prematurely, with the result that when necessary to use the can the heating element will have been exhausted; while if the water chamber is made absolutely water-tight, the cost of manufacture and the necessary examination and tests make the expense practically prohibitive. In addition, the user of the device is obliged to force an opening through the sheet-metal to allow the water to reach the chemical, which requires considerable effort and is awkward and inconvenient and calls for the use of a special cutting or piercing instrument capable of penetrating the entire thickness of the metal of the can.

Our invention aims to overcome these objections and to this end it is embodied, in preferable form, in the device shown in the accompanying drawings and hereinafter described.

Figure 4:
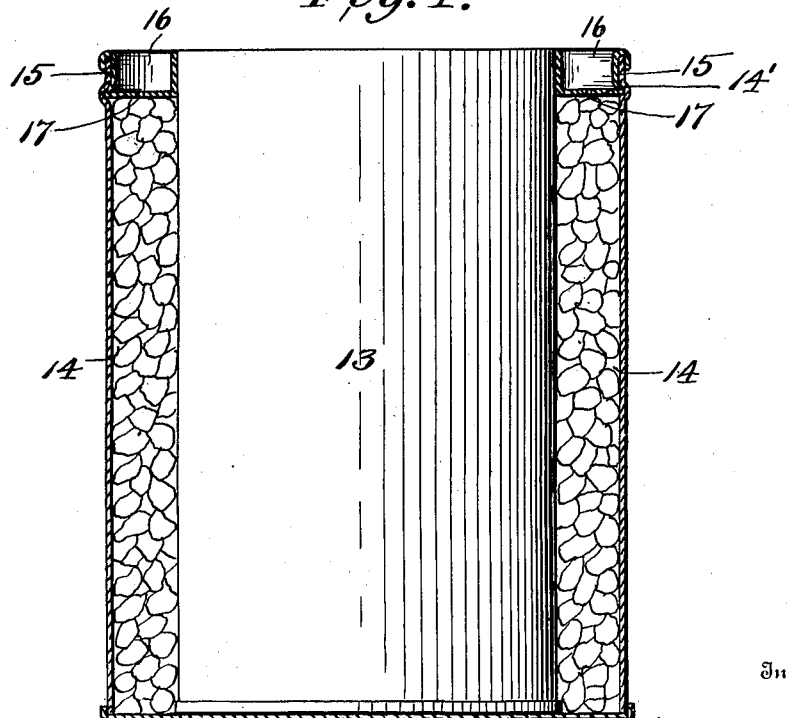

In these drawings, Figure 1 is a central vertical section of our improved can, and Fig. 2 is a plan view of the bottom end of the can shown in Fig. 1; Fig. 3 is a view similar to Fig. 2, showing a modified form of frangible division and closure wall. Fig. 4, is a central vertical section of another modified form of can and Fig. 5, a vertical section of a can showing the closure of Fig. 3, applied thereto.

Referring to the drawings and particularly to the can illustrated in Figs. 1 and 2, the food is contained in a food chamber formed preferably by an ordinary sheet-metal can or vessel 1, which is adapted to be placed within an outer can body or vessel 2. The outer can body has at one end a cover rim 3 and the food can fits within this rim and is soldered thereto.

The space between the wall of the food chamber and the wall of the outer can-body 2 forms a chamber 4, adapted to contain a suitable chemical which when mixed with water will set up a reaction and produce a heat sufficient to cook or heat the contents of the adjoining food chamber. Preferably calcium oxid (CaO) is employed, but any other chemical suitable for this purpose may be employed.

A closure for one end of the chemical receiving chamber, is secured within the outer can-body some distance from the end and thereby serves to divide said can-body into an open, exterior water retaining basin $9^1$ and an inclosed chemical chamber 4 formed by said closure, the walls of the food can and outer can-body and the other end of the can. This closure is provided with exposed frangible portions over the chemical containing chamber which may be readily disrupted to permit water to enter said chamber from the basin, so as to set up a heating re-action therein.

In the can of Figs. 1 and 2, the closure consists of a sheet metal disk 5, provided at intervals with annularly disposed holes 6, over the chamber 4 and of a lining or covering of paper 7 or other suitable frangible material, which is pasted or otherwise secured on the inner surface of the sheet-metal cover member, covering the holes 6 and serving to prevent the escape of the chemical therethrough.

In the practical construction of the device, the cover member 5 is preferably made with an integral annular vertical flange 8, and this cover member is adapted to be slipped within the can-body 2, its flange 8 and the portion of the outer can-body extending beyond the chamber 4, constituting the wall of the external water basin $9^1$. Such construction affords a convenient mode of forming the closure for the chemical containing chamber and the water retaining portion of the basin. This flange also serves to provide a desirable means of holding the closure within the can-body and also serves to strengthen the walls of the basin and to provide a rounded edge for the end of the can where it is turned over the can-body and soldered thereto.

A groove 9 may be formed in the can-body into which the metal cover member may be sprung. This cover member may also be crowned or raised at the central portion 10, so as to cause the water placed in the receptacle to flow over into the openings 6.

When it is desired to heat the contents of the can, it is merely necessary to turn the bottom end of the can up and break or open the paper cover through the openings 6, which may be readily done by means of a piece of wood, or any article that can be inserted into the holes. Water is then poured into the receptacle 9¹ and it flows into the chemical containing chamber through the openings 6, and reacting with the calcium oxid forms a hydro-oxid of calcium, $Ca(OH)_2$, and generates sufficient heat to thoroughly heat the food contents of the can. After the can has been left standing until the water has been absorbed by the chemical, the can is turned top end up, and permitted to stand a few minutes longer until the contents of the can have heated sufficiently. The upper end of the food can is then opened and the food removed. To provide for the ready opening of the food can, the end to be opened is preferably formed with a tearing strip 10ᵃ such as are commonly employed on sardine cans, and which are adapted to be removed by the twisting action of a key engaging the strip, but any other suitable and ordinary way of opening the can top may be used.

Figure 5:
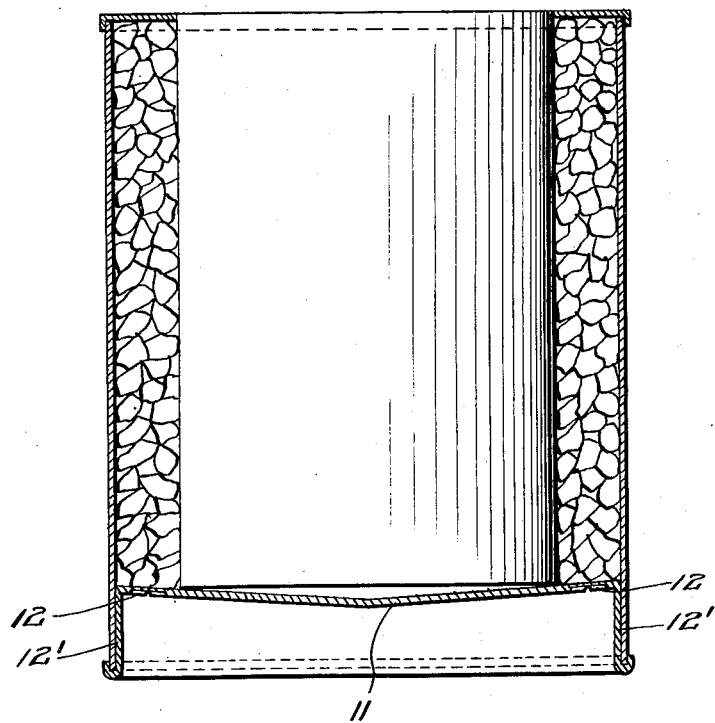

In Figs. 3 and 5 there is shown a modified form of can in which the closure for the chemical chamber, which divides said chamber from the water basin, consists merely of the sheet metal cover disk 11 and the frangible portions of the closure are provided by weakened portions 12 in the metal formed by crossed scores or cuts which partially pierce the metal, or similar means reducing the resistance of the metal and which render it possible for the disk to be readily disrupted and an opening effected by the pressure of some suitable means like the end of a key, the point of a knife or similar instrument. These weakened portions are annularly arranged, and located over the chemical containing chamber. In this form of can the inside paper cover is dispensed with. The cover disk 11 has an annular flange 12¹ engaging the outer can body.

In Fig. 4, there is illustrated a form of can in which the openings from the water receptacle to the chemical chamber and the opening end of the food chamber are at the same end of the can whereby there is no necessity of turning the can bottom end up to introduce the water into the chemical. In this form of the can an inner food can or receptacle 13 is continued out to an even height with the end of the wall of the outer can body 14. Between these two walls a closure consisting of an annulus 14′ having a flange 15 is sprung and soldered into place, and thereby forms a water receptacle 16, surrounding the end of the food chamber that is to be opened. This annulus is provided with weakened portions 17, over the chemical containing chamber and which are adapted to be opened to admit the water as in the case of the forms previously described. The weakened portions may either be formed by the open holes in the sheet-metal, covered by the paper covering as set forth with respect to the can of Figs. 1 and 2, or they may be formed according to the mode employed in the device of Fig. 3, and it is the latter form that is particularly shown in this single-ended can of Fig. 4.

A can constructed in accordance with the foregoing specification can be easily and cheaply manufactured and be readily opened without the aid of special appliances.

It is clear that various changes in the details of the device illustrated and described herein may be made without departing from the principle of our invention.

Having thus described our invention, what we claim is:

1. A heating can having an inner food-containing can-body, an outer can-body spaced therefrom, said can having a chemical containing chamber and an open exterior water-retaining basin, said chamber and basin being separated by an annular closure for the end of the chamber which closure is placed a short distance within the open end of the outer can-body and forms the bottom of the basin, and is provided with exposed frangible portions annularly disposed over the chamber, whereby the closure may be readily disrupted to permit water poured into the basin to pass to the said chamber, substantially as described.

2. A heating can having an inner food containing can-body, an outer can-body spaced therefrom, and means, having exposed frangible portions, for separating the space within the outer can-body and exterior to the inner can-body into a chemical-receiving chamber and an open, water-receiving basin, substantially as described.

3. A heating can having an inner food containing can-body, an outer can-body spaced therefrom, a sheet-metal cover member near one end of said outer can-body dividing said can-body into a chamber adapted to contain a chemical and an open basin adapted to receive water, said cover member having exposed weakened portions in the metal thereof, annularly disposed, over the chemical containing chamber whereby the said cover member may be disrupted to admit water to said chamber, substantially as described.

4. A heating can having an inner food containing can-body, an outer can body spaced therefrom to form a chemical containing chamber and means to close the end of said outer can-body said means having frangible portions which may be broken to admit water into the can-body and comprising a sheet-metal member fitting within the outer can-body a short distance from the end thereof, said member having a perpendicular flange, engaging said outer can body, whereby an open water receptacle is formed, substantially as described.

5. A heating can having an inner food-containing can-body, an outer can-body spaced therefrom, to form a chemical containing chamber a sheet metal member fitting within the outer can-body and having an inner annular disk portion extending across said space and an integral flange perpendicular to the disk, said flange having its end turned over and secured to the end of the outer can-body, whereby an open water receiving basin with a double wall and rounded edge is provided, means in the annular portion, normally closed, whereby openings from the basin to the chamber may be readily formed, substantially as described.

6. A heating can having an inner food containing can-body an outer can-body separated from the inner can-body by an annular space forming a chemical containing chamber, a cover member for said outer can-body having frangible portions, a groove in said outer can-body adapted to engage said cover, said cover member having an annular vertical flange forming a water retaining wall and said flange turned over the edge of the outer can-body, substantially as described.

In testimony whereof we affix our signatures, in presence of two subscribing witnesses.

PAUL FRIEDMAN.
ALBERT HARFORD CARLISLE.

Witnesses:
THOMAS ALLEN, 3d,
HENRY SILLCOCKS.